(12) United States Patent
Zhou

(10) Patent No.: US 10,104,018 B2
(45) Date of Patent: Oct. 16, 2018

(54) METHOD, APPARATUS, AND SYSTEM FOR CONTROLLING FORWARDING OF SERVICE DATA IN VIRTUAL NETWORK

(71) Applicant: Huawei Technologies Co., Ltd., Shenzhen, Guangdong (CN)

(72) Inventor: Wei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 15/160,667

(22) Filed: May 20, 2016

(65) Prior Publication Data

US 2016/0269325 A1    Sep. 15, 2016

Related U.S. Application Data

(63) Continuation of application No. PCT/CN2013/087714, filed on Nov. 22, 2013.

(51) Int. Cl.
| | |
|---|---|
| *H04L 12/931* | (2013.01) |
| *H04L 12/701* | (2013.01) |
| *H04L 12/46* | (2006.01) |
| *H04L 12/947* | (2013.01) |
| *H04L 12/715* | (2013.01) |

(52) U.S. Cl.
CPC .......... *H04L 49/70* (2013.01); *H04L 12/4641* (2013.01); *H04L 45/00* (2013.01); *H04L 45/64* (2013.01); *H04L 49/25* (2013.01)

(58) Field of Classification Search
None
See application file for complete search history.

(56) References Cited

U.S. PATENT DOCUMENTS

| | | | |
|---|---|---|---|
| 2011/0103259 A1 | 5/2011 | Aybay et al. | |
| 2011/0261722 A1* | 10/2011 | Awano | H04L 45/34 370/254 |
| 2011/0289230 A1* | 11/2011 | Ueno | H04L 45/42 709/228 |

(Continued)

FOREIGN PATENT DOCUMENTS

| | | |
|---|---|---|
| CN | 102055667 A | 5/2011 |
| CN | 102792645 A | 11/2012 |

(Continued)

*Primary Examiner* — Hicham B Foud
*Assistant Examiner* — Gautam Sharma

(57) ABSTRACT

Embodiments of the present invention provide a method, an apparatus, and a system for controlling forwarding of service data in a virtual network, which relate to the field of communications and are used to improve user experience. The method includes: obtaining, by a forwarding control node, a processing rule of a service and connection information of a virtual network; determining, by the forwarding control node according to the processing rule of the service and the connection information of the virtual network, a forwarding path that a data packet of the service needs to pass through; generating, by the forwarding control node, a corresponding forwarding rule for a virtual switching node according to the forwarding path; and sending, by the forwarding control node, the forwarding rule to the virtual switching node. Embodiments of the present invention are applicable to a scenario of packet processing.

3 Claims, 10 Drawing Sheets

(56) References Cited

U.S. PATENT DOCUMENTS

| | | | | |
|---|---|---|---|---|
| 2011/0305168 | A1* | 12/2011 | Koide | H04L 41/12 370/255 |
| 2011/0307628 | A1* | 12/2011 | Chiba | H04L 49/355 709/241 |
| 2011/0310894 | A1* | 12/2011 | Karino | H04L 45/38 370/389 |
| 2011/0317701 | A1* | 12/2011 | Yamato | H04L 45/04 370/392 |
| 2012/0113989 | A1 | 5/2012 | Akiyoshi | |
| 2012/0177039 | A1* | 7/2012 | Berman | H04L 45/02 370/390 |
| 2012/0263186 | A1* | 10/2012 | Ueno | H04L 45/306 370/401 |
| 2013/0003745 | A1 | 1/2013 | Nishimura | |
| 2013/0044636 | A1* | 2/2013 | Koponen | H04L 47/12 370/254 |
| 2013/0070762 | A1 | 3/2013 | Adams et al. | |
| 2013/0151685 | A1 | 6/2013 | Bursell | |
| 2013/0282867 | A1 | 10/2013 | Take | |
| 2013/0286844 | A1 | 10/2013 | Ishizuka | |
| 2013/0308462 | A1 | 11/2013 | Ashida et al. | |
| 2013/0322257 | A1* | 12/2013 | Shimonishi | H04L 41/0893 370/236 |
| 2015/0063360 | A1* | 3/2015 | Thakkar | H04L 45/745 370/400 |
| 2015/0063364 | A1* | 3/2015 | Thakkar | H04L 12/66 370/401 |

FOREIGN PATENT DOCUMENTS

| | | |
|---|---|---|
| CN | 102934400 A | 2/2013 |
| CN | 103190126 A | 7/2013 |
| CN | 103283187 A | 9/2013 |
| CN | 103283191 A | 9/2013 |
| CN | 103348638 A | 10/2013 |

* cited by examiner

ND, APPARATUS, AND SYSTEM FOR
CONTROLLING FORWARDING OF
SERVICE DATA IN VIRTUAL NETWORK

CROSS-REFERENCE TO RELATED APPLICATION

This application is a continuation of International Application No. PCT/CN2013/087714, filed Nov. 22, 2013, which is incorporated herein by reference.

TECHNICAL FIELD

The present invention relates to the field of network communications, and in particular, to a method, an apparatus, and a system for controlling forwarding of service data in a virtual network.

BACKGROUND

An SDN (Software Defined Network) is a new network architecture, and its core technology OpenFlow can provide a good platform for a core network and application innovation by separating a control plane from a forwarding plane. An OpenFlow network is made up of an OpenFlow switch and an external controller. The OpenFlow switch includes a flow table, a secure channel, and an OpenFlow protocol. In the OpenFlow network, the OpenFlow switch maintains only one flow table, and performs forwarding only according to the flow table. Generation, maintenance, and delivery of the flow table are implemented by the external controller.

A cloud computing platform is made up of a series of resources that may be dynamically upgraded and virtualized, and these resources are shared by all cloud computing users. Implementation of the cloud computing platform generally involves three parts: a control node, a computing node, and a network control node. The control node is configured to control operation content of a virtual machine on the whole cloud computing platform; the computing node is configured to operate the virtual machine; and the network control node provides a network service for the cloud computing platform. The virtual machine and a switch for constructing a virtual network are included on the computing node.

In an SDN-based cloud computing platform network, a network control node provides a network service for a cloud computing platform by controlling a flow table on a switch on a computing node. A service control node works as an external controller. Services are deployed on the service control node and processed by controlling the flow table.

In the process of implementing service deployment, the inventor finds that the prior art has at least the following problem: Because connectivity between nodes in the cloud computing platform network is not considered during service deployment, a service may not be implemented due to poor network connectivity, which further reduces user experience.

SUMMARY

Embodiments of the present invention provide a method, an apparatus, and a system for controlling forwarding of service data in a virtual network to improve user experience.

To achieve the foregoing objectives, the present invention uses the following technical solutions:

According to a first aspect, an embodiment of the present invention provides a method for controlling forwarding of service data in a virtual network, including: obtaining, by a forwarding control node, a processing rule of a service and connection information of the virtual network; determining, by the forwarding control node according to the processing rule of the service and the connection information of the virtual network, a forwarding path that a data packet of the service needs to pass through, where the forwarding path includes a virtual processing node, a virtual switching node, and a physical network node; generating, by the forwarding control node, a corresponding forwarding rule for the virtual switching node according to the forwarding path; and sending, by the forwarding control node, the forwarding rule to the virtual switching node, where: the connection information of the virtual network includes the virtual processing node, the virtual switching node, and the physical network node, where the virtual processing node is configured to perform a specific type of processing on the data packet, and the virtual switching node is configured to forward the data packet; the processing rule of the service is used to indicate a sequence of processing required for the data packet; and the forwarding rule is used to indicate a next virtual processing node, virtual switching node, or physical network node to which the data packet needs to be forwarded.

According to a second aspect, an embodiment of the present invention provides a method for controlling forwarding of service data in a virtual network, including: receiving, by a virtual switching node, a forwarding rule sent by a forwarding control node, where the virtual switching node is configured to forward a data packet, and the forwarding rule is used to indicate a next virtual processing node, virtual switching node, or physical network node to which the data packet needs to be forwarded; and storing, by the virtual switching node, the forwarding rule.

According to a third aspect, an embodiment of the present invention provides a method for controlling forwarding of service data in a virtual network, including: establishing, by a first control node, a connection to a forwarding control node or a virtual switching node; and sending, by the first control node, first information to the forwarding control node or the virtual switching node.

According to a fourth aspect, an embodiment of the present invention provides a forwarding control node, including: an obtaining unit, configured to obtain a processing rule of a service and connection information of a virtual network; a determining unit, configured to determine, according to the processing rule of the service and the connection information of the virtual network which are obtained by the obtaining unit, a forwarding path that a data packet of the service needs to pass through, where the forwarding path includes a virtual processing node, a virtual switching node, and a physical network node; and a generating unit, configured to generate a corresponding forwarding rule for the virtual switching node according to the forwarding path determined by the determining unit, where: the connection information of the virtual network includes the virtual processing node, the virtual switching node, and the physical network node, where the virtual processing node is configured to perform a specific type of processing on the data packet, and the virtual switching node is configured to forward the data packet; the processing rule of the service is used to indicate a sequence of processing required for the data packet; and the forwarding rule is used to indicate a next virtual processing node, virtual switching node, or physical network node to which the data packet needs to be forwarded.

According to a fifth aspect, an embodiment of the present invention provides a virtual switching node, including: a receiving unit, configured to receive a forwarding rule sent by a forwarding control node, where the forwarding rule is used to indicate a next virtual processing node, virtual switching node, or physical network node to which a data packet needs to be forwarded; and a storing unit, configured to store the forwarding rule.

According to a sixth aspect, an embodiment of the present invention provides a forwarding control node, including: a connecting unit, configured to establish a connection to a forwarding control node or a virtual switching node; and a sending unit, configured to send first information to the forwarding control node or the virtual switching node.

According to a seventh aspect, an embodiment of the present invention provides a forwarding control node, including: a processor and a memory, where: the processor is configured to obtain a processing rule of a service and connection information of a virtual network; the processor is further configured to determine, according to the processing rule of the service and the connection information of the virtual network, a forwarding path that a data packet of the service needs to pass through, where the forwarding path includes a virtual processing node, a virtual switching node, and a physical network node; the processor is further configured to generate a corresponding forwarding rule for the virtual switching node according to the forwarding path; the connection information of the virtual network includes the virtual processing node, the virtual switching node, and the physical network node; the virtual processing node is configured to perform a specific type of processing on the data packet; the virtual switching node is configured to forward the data packet; the processing rule of the service is used to indicate a sequence of processing required for the data packet; and the forwarding rule is used to indicate a next virtual processing node, virtual switching node, or physical network node to which the data packet needs to be forwarded.

According to an eighth aspect, an embodiment of the present invention provides a virtual switching node, including: a receiver, configured to receive a forwarding rule sent by a forwarding control node, where the forwarding rule is used to indicate a next virtual processing node, virtual switching node, or physical network node to which a data packet needs to be forwarded; and a memory, configured to store the forwarding rule.

According to a ninth aspect, an embodiment of the present invention provides a control node, including a processor, a transmitter, and a memory, where: the processor is configured to establish a connection to a forwarding control node or a virtual switching node; and the transmitter is configured to send first information to the forwarding control node or the virtual switching node.

According to a tenth aspect, an embodiment of the present invention provides a system for controlling forwarding of service data in a virtual network, where the system includes a forwarding control node, a virtual switching node, and a first control node, where: the forwarding control node is the forwarding control node in the foregoing embodiment; the virtual switching node is the virtual switching node in the foregoing embodiment; and the first control node is the control node in the foregoing embodiment.

Embodiments of the present invention provide a method, an apparatus, and a system for controlling forwarding of service data in a virtual network. A forwarding control node first obtains a processing rule of a service and connection information of a virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node. In this way, the forwarding control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
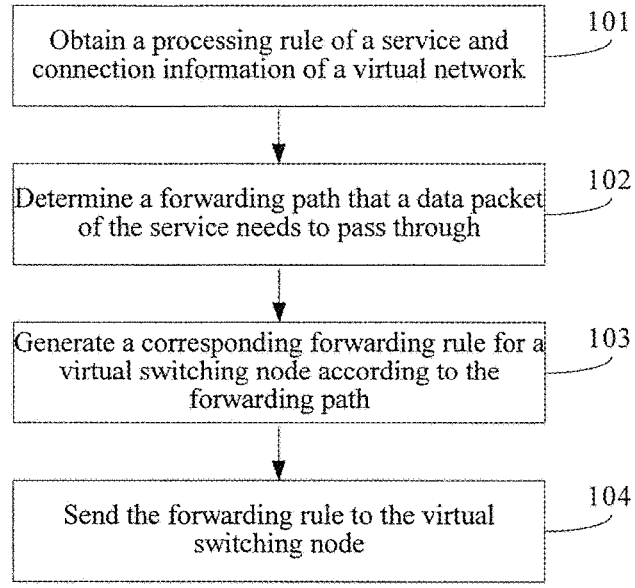
FIG. 1 is a schematic flowchart of controlling forwarding of service data in a virtual network according to an embodiment of the present invention.

As shown in FIG. 1, an embodiment of the present invention provides a method for controlling forwarding of service data in a virtual network, including:

101. A forwarding control node obtains a processing rule of a service and connection information of the virtual network.

The connection information of the virtual network includes a virtual processing node, a virtual switching node, and a physical network node. The virtual processing node is configured to perform a specific type of processing on a data packet. The virtual switching node is configured to forward the data packet. The processing rule of the service is used to indicate a sequence of processing required for the data packet.

It should be noted that the connection information of the virtual network is actual connection information of all nodes of the virtual network, that is, the connection information of the virtual network carries all topological structure information of the virtual network.

It should be noted that the processing rule of the service is a sequence of processing the data packet first on which node and then on which node when the data packet requires service processing.

It should be noted that a type of processing performed by the virtual processing node on the data packet may be charging processing, traffic control processing, and the like, on a received packet. The virtual switching node is configured to forward the data packet, and further configured to store a forwarding rule generated by the forwarding control node.

Further, the forwarding control node may be a service control node, or may be a network control node, which can be preset by a user according to a requirement.

The network control node is configured to manage networking of the virtual network, and the connection information of the virtual network is stored in the network control node. The service control node is configured to manage processing of the service, and the processing rule of the service is stored in the service control node.

Specifically, when the forwarding control node is a network control node, the network control node obtains the connection information of the virtual network locally. According to specific different networking of the network, there are two methods for obtaining the processing rule of the service by the network control node: One is obtaining the processing rule of the service from the service control node, and the other is obtaining the processing rule of the service from the virtual switching node.

Specifically, when the forwarding control node is a service control node, the service control node obtains the processing rule of the service locally. According to specific different networking of the network, there are two methods for obtaining the connection information of the virtual network by the service control node: One is obtaining the connection information of the virtual network from the network control node, and the other is obtaining the connection information of the virtual network from the virtual switching node.

It should be noted that the processing rule of the service and the connection information of the virtual network may be separately stored in a form of a flow table. However, the specific storage form is not limited by the present invention.

It should be noted that each flow table includes multiple entries, where each entry includes a match field, a counter, and an action set. Match field information includes: a destination address, a source address, an input port, and so on. Counter information includes the number of searches and so on. Action set information includes a set of processing to be performed on the data packet.

It should be noted that when the forwarding control node processes the data packet by using the flow table, the forwarding control node first compares forwarding information carried in the data packet with the match field of each entry sequentially, and when the information carried in the data packet successfully matches match field information of an entry, performs a corresponding action according to the entry.

Specifically, when the connection information of the virtual network is represented by a flow table, a connection relationship between nodes can be obtained according to a flow table generated by the network control node.

Exemplarily, the flow table generated by the network control node is as follows:

match field: a destination IP address is a server address, and a VLAN (Virtual Local Area Network) identifier is 1; action: modifying an outbound port to the network control node, and modifying the VLAN to 1024; and match field: a source address is the network control node, and a VLAN is 1024; action: modifying an outbound port to a port of the destination IP address, and modifying the VLAN to 1.

For the obtained flow table, when the destination address in the match field is an IP address of an external network and the action is modifying an outbound port to the network control node, and the flow table has a match field entry in which a source address is the network control node, it indicates that there is a connection between the virtual switching node and the network control node.

Exemplarily, the flow table generated by the network control node is as follows:

match field: an inbound port is port A; action: modifying an outbound port to port B and port C;

match field: an inbound port is port B; action: modifying an outbound port to port A and port C;

match field: an inbound port is port C; action: modifying an outbound port to port A and port B;

match field: an inbound port is port D; action: modifying an outbound port to port E; and match field: an inbound port is port E; action: modifying an outbound port to port D.

For processing in which a match field and an action field include only port fields, it is considered that nodes connected to the ports belong to a same network. The foregoing flow table indicates that five nodes A, B, C, D, E are connected to a switch, but A, B, and C belong to a same network, and D and E belong to a same network.

102. The forwarding control node determines, according to the processing rule of the service and the connection information of the virtual network, a forwarding path that a data packet of the service needs to pass through.

The forwarding path includes a virtual processing node, a virtual switching node, and a physical network node.

It should be noted that the forwarding path is generated based on the connection information of the virtual network, that is, the forwarding path is generated based on a complete topological structure of the virtual network.

It should be noted that the forwarding path that the data packet of the service needs to pass through is specific forwarding steps of each hop of the data packet which are obtained by combining the processing rule of the service, where the processing rule of the service carries all topological structure information of the virtual network and service processing steps required for the data packet. Therefore, when the data packet is forwarded according to the forwarding path, network connectivity can be ensured definitely, and a case in which the network connection is blocked does not exist during forwarding.

Figure 2:
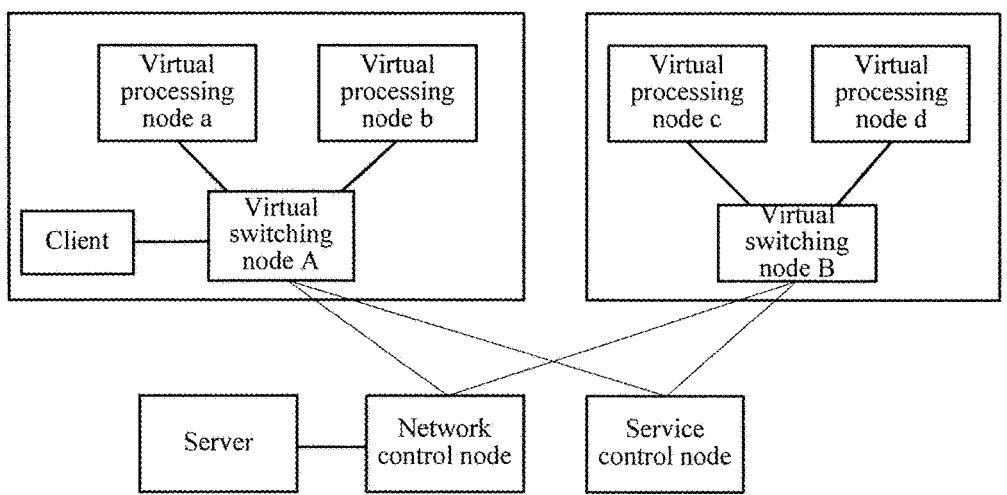
FIG. 2 is a schematic diagram of networking of a virtual network according to an embodiment of the present invention.

Exemplarily, networking of the virtual network is shown in FIG. 2, and the network control node works as a gateway for external access by the virtual network, regardless of whether the forwarding control node is a network control node or a service control node. The connection information of the virtual network is all connection information of the virtual network. The processing rule of the service is sending a data packet received from the server first to virtual processing node a for processing, then to virtual processing node c for processing, and finally to a client.

The determining, by the forwarding control node according to the processing rule of the service and the connection information of the virtual network, a forwarding path that a data packet of the service needs to pass through, is: first sending the data packet to the network control node, then sending the data packet to virtual processing node a through virtual switching node A, then sending the data packet to the network control node through virtual switching node A, then sending the data packet to virtual processing node c through virtual switching node B, then sending the data packet to the network control node through virtual switching node B, and finally, sending the data packet to the client through the network control node.

103. The forwarding control node generates a corresponding forwarding rule for the virtual switching node according to the forwarding path.

Specifically, after determining the forwarding path for the data packet, the forwarding control node may use the forwarding path as content of the forwarding rule, and generate the forwarding rule for the virtual switching node.

Exemplarily, the forwarding path shown in step 102 may be represented by the following flow table:

match field: a destination address is the server, and a source address is the client; action: modifying an outbound port to a port connecting to virtual machine a;

match field: a destination address is the server, and a source address is the port connecting to virtual machine a; action: modifying an outbound port to the network control node;

match field: a destination address is the server, and a source address is the network control node; action: modifying an outbound port to a port connecting to virtual machine b; and match field: a destination address is the server, and a source address is the port connecting to virtual machine b; action: modifying an outbound port to the network control node.

104. The forwarding control node sends the forwarding rule to the virtual switching node.

It should be noted that because the forwarding rule needs to be finally sent to the virtual switching node for storing, the forwarding control node needs to send the forwarding rule to the virtual switching node.

The embodiment of the present invention provides a method for controlling forwarding of service data in a virtual network. A forwarding control node first obtains a processing rule of a service and connection information of a virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node. In this way, the forwarding control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 3:
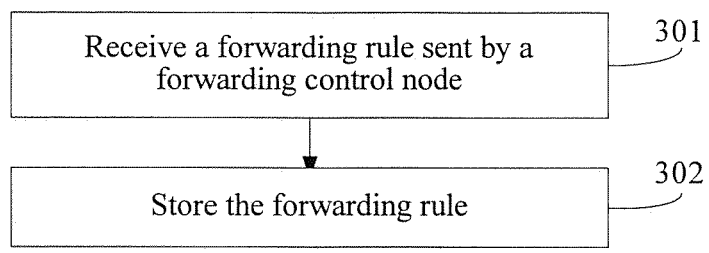
FIG. 3 is another schematic flowchart of controlling forwarding of service data in a virtual network according to an embodiment of the present invention.

As shown in FIG. 3, an embodiment of the present invention provides a method for controlling forwarding of service data in a virtual network, including:

301. A virtual switching node receives a forwarding rule sent by a forwarding control node.

The virtual switching node is configured to forward a data packet. The forwarding rule is used to indicate a next virtual processing node, virtual switching node, or physical network node to which the data packet needs to be forwarded.

It should be noted that, regardless of whether the forwarding control node is a network control node or a service control node, the forwarding control node needs to send the forwarding rule to the virtual switching node, so that the virtual switching node saves the forwarding rule.

302. The virtual switching node stores the forwarding rule.

It should be noted that the virtual switching node needs to store the forwarding rule, and then performs corresponding processing according to the forwarding rule when the packet needs to be processed.

The embodiment of the present invention provides a method for controlling forwarding of service data in a virtual network. A virtual switching node receives a forwarding rule sent by a forwarding control node, and stores the forwarding rule. In this way, after the forwarding control node generates a forwarding rule combining a processing rule of a service and connection information of a virtual network, the forwarding control node can send the forwarding rule to a virtual switching node, so that the virtual switching node stores the forwarding rule. Therefore, during packet forwarding, the forwarding rule combining the processing rule of the service and the connection information of the virtual network can be searched out, and further, network connectivity can be ensured during service processing, thereby improving user experience.

Figure 4:
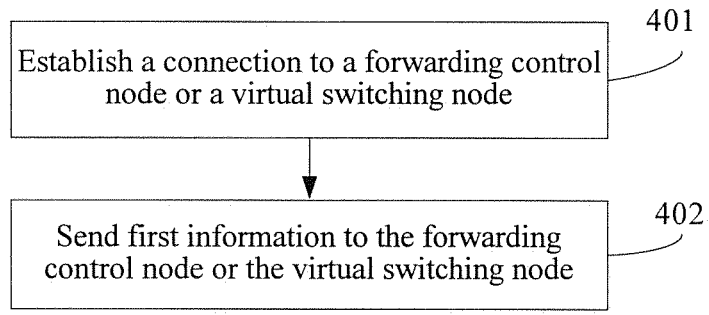
FIG. 4 is another schematic flowchart of controlling forwarding of service data in a virtual network according to an embodiment of the present invention.

As shown in FIG. 4, an embodiment of the present invention provides a method for controlling forwarding of service data in a virtual network, including:

401. A first control node establishes a connection to a forwarding control node or a virtual switching node.

It should be noted that the first control node may vary with the forwarding control node. When the forwarding control node is a network control node, the first control node is a service control node; when the forwarding control node is a service control node, the first control node is a network control node.

Specifically, according to different first control nodes, and different manners of obtaining connection information of the virtual network and a processing rule of a service by the forwarding control node, the first control node may establish a connection in the following four cases.

In a first case, when the forwarding control node is a network control node, the first control node is a service control node, and when the network control node needs to obtain the connection information of the virtual network through the virtual switching node, the service control node needs to establish a connection to the virtual switching node.

In a second case, when the forwarding control node is a network control node, the first control node is a service control node, and when the network control node needs to obtain the connection information of the virtual network through the service control node, the service control node needs to establish a connection to the network control node.

In a third case, when the forwarding control node is a service control node, the first control node is a network control node, and when the service control node needs to obtain the processing rule of the service through the virtual switching node, the network control node needs to establish a connection to the virtual switching node.

In a fourth case, when the forwarding control node is a service control node, the first control node is a network control node, and when the service control node needs to obtain the processing rule of the service through the network control node, the network control node needs to establish a connection to the service control node.

It should be noted that the manner of establishing a connection by the first control node to the forwarding control node may be: The forwarding control node provides an interface, and then the first control node controls the interface. The manner may also be: The forwarding control node is in a form of a plug-in, and then the first control node controls the plug-in.

It should be noted that the specific manner of establishing a connection by the first control node to a second control node is the same as that in the prior art, and is not further described herein.

402. The first control node sends first information to the forwarding control node or the virtual switching node.

Further, when the forwarding control node is a network control node, the first control node is a service control node, and the first information is the processing rule of the service; when the forwarding control node is a service control node, the first control node is a network control node, and the first information is the connection information of the virtual network.

The embodiment of the present invention provides a method for controlling forwarding of service data in a virtual network. A first control node establishes a connection to a forwarding control node or a virtual switching node, and then directly sends first information to the forwarding control node, or sends first information to the virtual switching node which then forwards the first information to the forwarding control node, so that the forwarding control node generates a forwarding rule. In this way, during packet forwarding, the forwarding rule combining a processing rule of a service and connection information of the virtual network can be searched out, and further, network connectivity can be ensured during service processing, thereby improving user experience.

Figure 5:
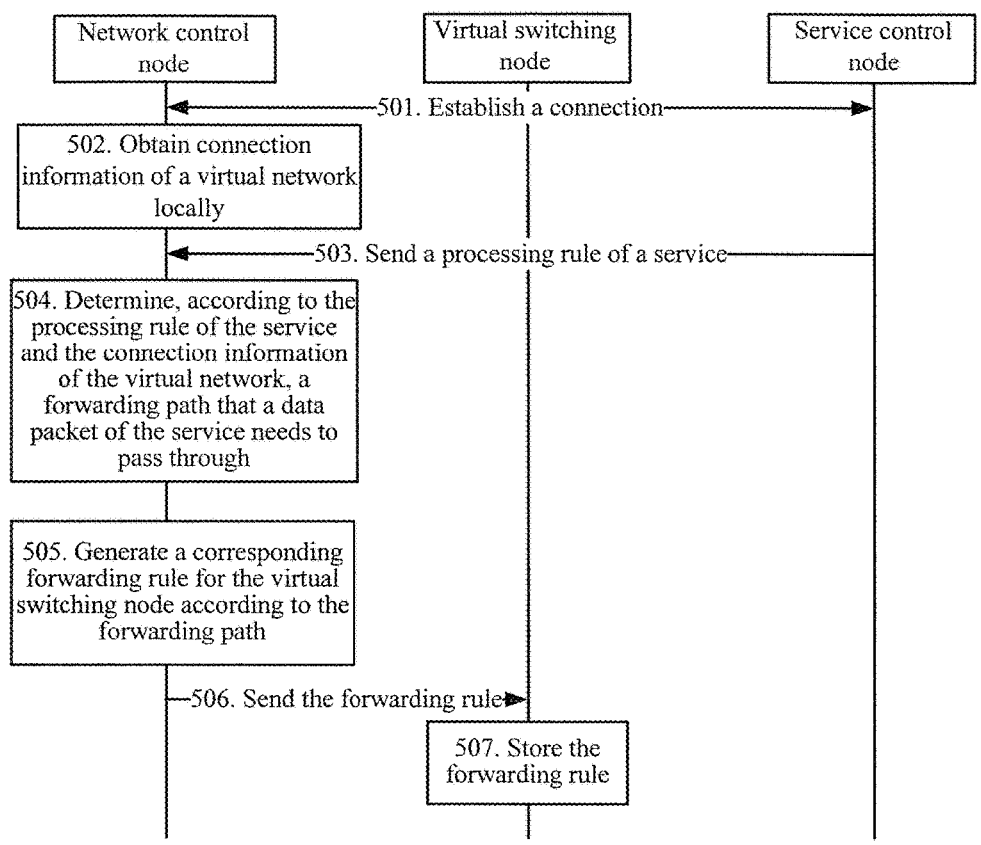
FIG. 5 is another schematic flowchart of controlling forwarding of service data in a virtual network according to an embodiment of the present invention.

FIG. 5 shows a method for controlling forwarding of service data in a virtual network according to an embodiment of the present invention.

When a forwarding control node is a network control node, a first control node is a service control node. When the network control node obtains a processing rule of a service from the service control node, as shown in FIG. 5, the method includes the following:

501. The network control node establishes a connection to the service control node.

It should be noted that the manner of establishing a connection by the network control node to the service control node may be: The network control node provides an interface, and then the service control node controls the interface. The manner may also be: The network control node is in a form of a plug-in, and then the service control node controls the plug-in. The specific manner of establishing the connection between the network control node and the service control node is not limited by the present invention.

502. The network control node obtains connection information of the virtual network locally.

The network control node is configured to manage networking of the virtual network, and the connection information of the virtual network is stored in the network control node.

503. The service control node sends the processing rule of the service to the network control node, and the network control node obtains the processing rule of the service from the service control node.

The service control node is configured to manage processing of the service, and the processing rule of the service is stored in the service control node.

504. The network control node determines, according to the processing rule of the service and the connection information of the virtual network, a forwarding path that a data packet of the service needs to pass through.

The forwarding path includes a virtual processing node, a virtual switching node, and a physical network node.

For details, reference may be made to step 102. Details are not repeated herein.

505. The network control node generates a corresponding forwarding rule for the virtual switching node according to the forwarding path.

For details, reference may be made to step 103. Details are not repeated herein.

506. The network control node sends the forwarding rule to the virtual switching node, and the virtual switching node receives the forwarding rule sent by the network control node.

It should be noted that because the forwarding rule needs to be finally sent to the virtual switching node for storing, the network control node needs to send the forwarding rule to the virtual switching node.

507. The virtual switching node stores the forwarding rule.

It should be noted that the virtual switching node needs to store the forwarding rule, and then performs corresponding processing according to the forwarding rule when the packet needs to be processed.

The embodiment of the present invention provides a method for controlling forwarding of service data in a virtual network. A network control node first obtains a processing rule of a service and connection information of the virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node; and the virtual switching node receives and stores the forwarding rule. In this way, the network control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 6:
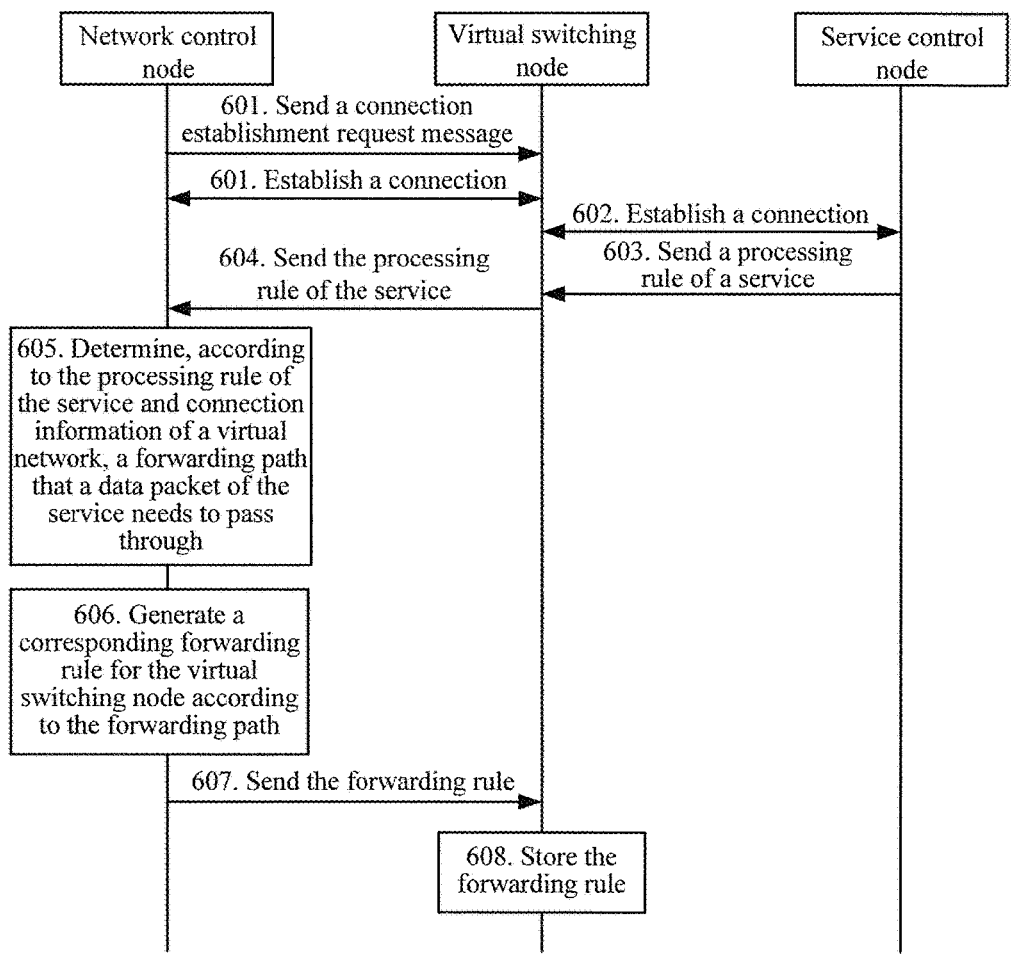
FIG. 6 is another schematic flowchart of controlling forwarding of service data in a virtual network according to an embodiment of the present invention.

FIG. 6 shows a method for controlling forwarding of service data in a virtual network according to an embodiment of the present invention.

When a forwarding control node is a network control node, a first control node is a service control node. When the network control node obtains a processing rule of a service from a virtual switching node, as shown in FIG. 6, the method includes the following:

601. The network control node sends a connection establishment request message to the virtual switching node, and the virtual switching node receives the connection establishment request message sent by the network control node, and establishes a connection to the network control node.

The connection establishment request message carries first identification information, which is used to identify that the virtual switching node forwards the processing rule of the service to the network control node after reception of the processing rule of the service sent by the service control node.

It should be noted that the connection between the network control node and the virtual switching node is not an ordinary connection relationship between a controller and a switch, but is implemented by using an API (Application Programming Interface) of a cloud platform. As a result, a connection is allowed to be established between the service control node and the virtual switching node.

602. The service control node establishes a connection to the virtual switching node.

It should be noted that the connection between the service control node and the virtual switching node is not an ordinary connection relationship between a controller and a switch, but is implemented by using an API of the cloud platform.

603. The service control node sends the processing rule of the service to the virtual switching node, and the virtual switching node receives the processing rule of the service sent by the service control node.

It should be noted that the virtual switching node temporarily stores the received processing rule of the service, so as to further send the processing rule of the service to the network control node.

604. The virtual switching node sends the processing rule of the service to the network control node according to the first identification information, and the network control node obtains the processing rule of the service from the virtual switching node.

The processing rule of the service is stored in the virtual switching node.

605. The network control node determines, according to the processing rule of the service and connection information of the virtual network, a forwarding path that a data packet of the service needs to pass through.

The forwarding path includes a virtual processing node, a virtual switching node, and a physical network node.

For details, reference may be made to step 102. Details are not repeated herein.

606. The network control node generates a corresponding forwarding rule for the virtual switching node according to the forwarding path.

For details, reference may be made to step 103. Details are not repeated herein.

607. The network control node sends the forwarding rule to the virtual switching node, and the virtual switching node receives the forwarding rule sent by the network control node.

It should be noted that because the forwarding rule needs to be finally sent to the virtual switching node for storing, the network control node needs to send the forwarding rule to the virtual switching node.

608. The virtual switching node stores the forwarding rule.

It should be noted that the virtual switching node needs to store the forwarding rule, and then performs corresponding processing according to the forwarding rule when the packet needs to be processed.

The embodiment of the present invention provides a method for controlling forwarding of service data in a virtual network. A network control node first obtains a processing rule of a service and connection information of the virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node; and the virtual switching node receives and stores the forwarding rule. In this way, the network control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 7:
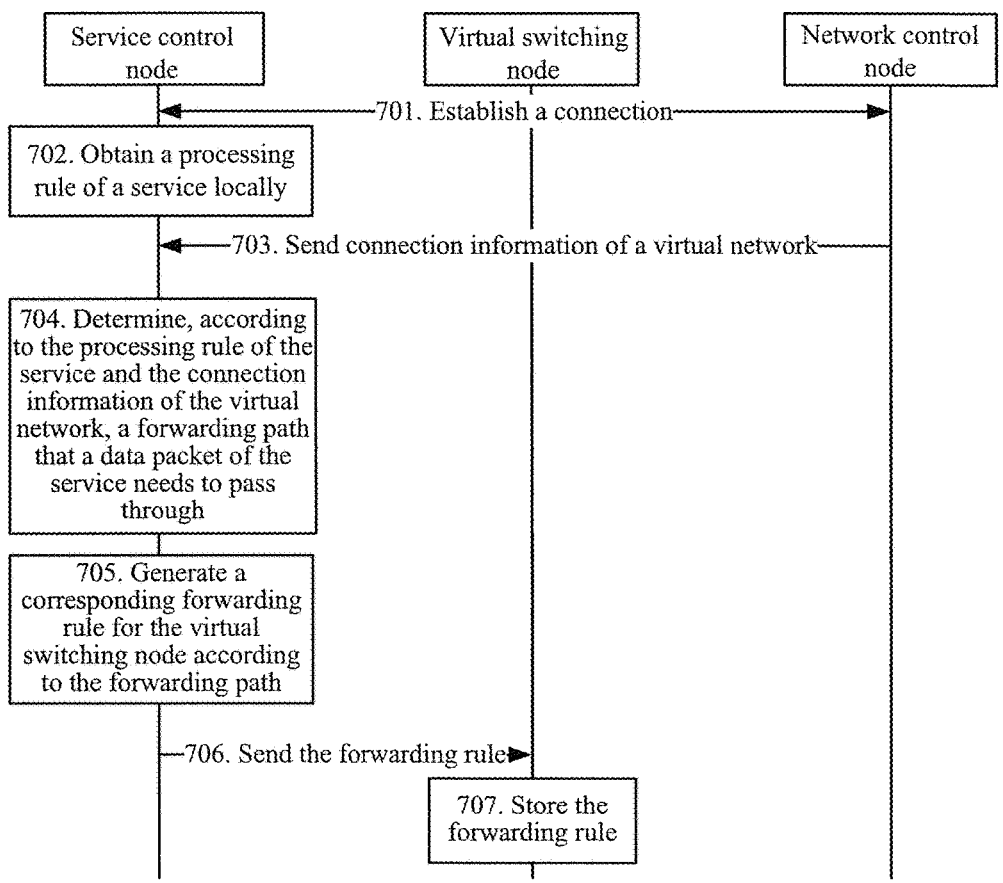
FIG. 7 is another schematic flowchart of controlling forwarding of service data in a virtual network according to an embodiment of the present invention.

FIG. 7 shows a method for controlling forwarding of service data in a virtual network according to an embodiment of the present invention.

When a forwarding control node is a service control node, a first control node is a network control node. When the service control node obtains connection information of the virtual network from the network control node, as shown in FIG. 7, the method includes the following:

701. The service control node establishes a connection to the network control node.

It should be noted that the manner of establishing a connection by the service control node with the network control node may be: The service control node provides an interface, and then the network control node controls the interface. The manner of establishing may also be: The service control node is in a form of a plug-in, and then the network control node controls the plug-in. The specific manner of establishing the connection between the service control node and the network control node is not limited by the present invention.

702. The service control node obtains a processing rule of a service locally.

The service control node is configured to manage processing of the service, and the processing rule of the service is stored in the service control node.

703. The network control node sends the connection information of the virtual network to the service control node, and the service control node obtains the connection information of the virtual network from the network control node.

The network control node is configured to manage networking of the virtual network, and the connection information of the virtual network is stored in the network control node.

704. The service control node determines, according to the processing rule of the service and the connection information of the virtual network, a forwarding path that a data packet of the service needs to pass through.

The forwarding path includes a virtual processing node, a virtual switching node, and a physical network node.

For details, reference may be made to step 102. Details are not repeated herein.

705. The service control node generates a corresponding forwarding rule for the virtual switching node according to the forwarding path.

For details, reference may be made to step 103. Details are not repeated herein.

706. The service control node sends the forwarding rule to the virtual switching node, and the virtual switching node receives the forwarding rule sent by the network control node.

It should be noted that because the forwarding rule needs to be finally sent to the virtual switching node for storing, the service control node needs to send the forwarding rule to the virtual switching node.

707. The virtual switching node stores the forwarding rule.

It should be noted that the virtual switching node needs to store the forwarding rule, and then performs corresponding processing according to the forwarding rule when the packet needs to be processed.

The embodiment of the present invention provides a method for controlling forwarding of service data in a virtual network. A service control node first obtains a processing rule of a service and connection information of the virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node; and the virtual switching node receives and stores the forwarding rule. In this way, the service control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 8:
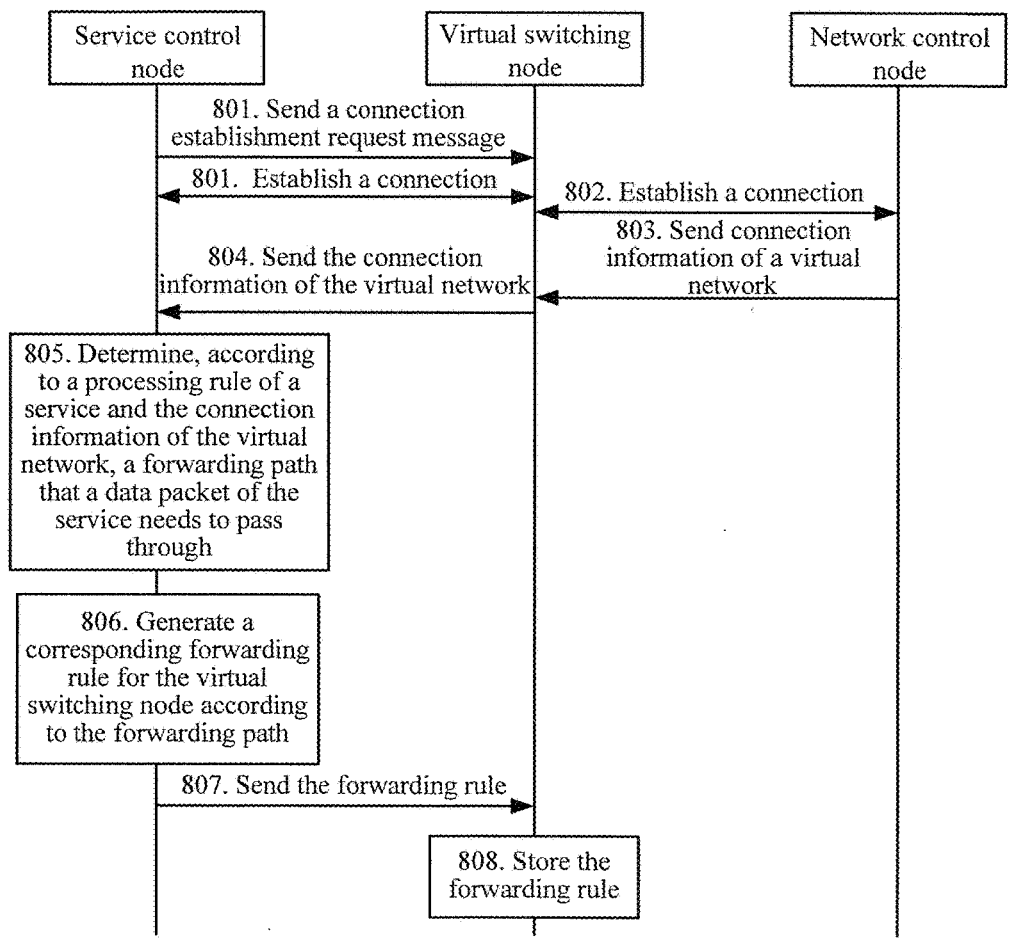
FIG. 8 is another schematic flowchart of controlling forwarding of service data in a virtual network according to an embodiment of the present invention.

FIG. 8 shows a method for controlling forwarding of service data in a virtual network according to an embodiment of the present invention.

When a forwarding control node is a service control node, a first control node is a network control node. When the service control node obtains connection information of the virtual network from a virtual switching node, as shown in FIG. 8, the method includes the following:

801. The service control node sends a connection establishment request message to the virtual switching node, and the virtual switching node receives the connection establishment request message sent by the service control node, and establishes a connection to the service control node.

The connection establishment request message carries first identification information, which is used to identify that the virtual switching node forwards the connection information of the virtual network to the service control node after reception of the connection information of the virtual network sent by the network control node.

It should be noted that the connection between the service control node and the virtual switching node is not an ordinary connection relationship between a controller and a switch, but is implemented by using an API of a cloud platform. As a result, a connection is allowed to be established between the network control node and the virtual switching node.

802. The network control node establishes a connection to the virtual switching node.

It should be noted that the connection between the network control node and the virtual switching node is not an ordinary connection relationship between a controller and a switch, but is implemented by using an API of the cloud platform.

803. The network control node sends the connection information of the virtual network to the virtual switching node, and the virtual switching node receives the connection information of the virtual network sent by the network control node.

It should be noted that the virtual switching node temporarily stores the received connection information of the virtual network, so as to further send the connection information of the virtual network to the service control node.

804. The virtual switching node sends the connection information of the virtual network to the service control node according to the first identification information, and the service control node obtains the connection information of the virtual network from the virtual switching node.

The connection information of the virtual network is stored in the virtual switching node.

805. The service control node determines, according to a processing rule of a service and the connection information of the virtual network, a forwarding path that a data packet of the service needs to pass through.

The forwarding path includes a virtual processing node, a virtual switching node, and a physical network node.

For details, reference may be made to step 102. Details are not repeated herein.

806. The service control node generates a corresponding forwarding rule for the virtual switching node according to the forwarding path.

For details, reference may be made to step 103. Details are not repeated herein.

807. The service control node sends the forwarding rule to the virtual switching node, and the virtual switching node receives the forwarding rule sent by the service control node.

It should be noted that because the forwarding rule needs to be finally sent to the virtual switching node for storing, the service control node needs to send the forwarding rule to the virtual switching node.

808. The virtual switching node stores the forwarding rule.

It should be noted that the virtual switching node needs to store the forwarding rule, and then performs corresponding processing according to the forwarding rule when the packet needs to be processed.

The embodiment of the present invention provides a method for controlling forwarding of service data in a virtual network. A service control node first obtains a processing rule of a service and connection information of the virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node; and the virtual switching node receives and stores the forwarding rule. In this way, the service control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 9:
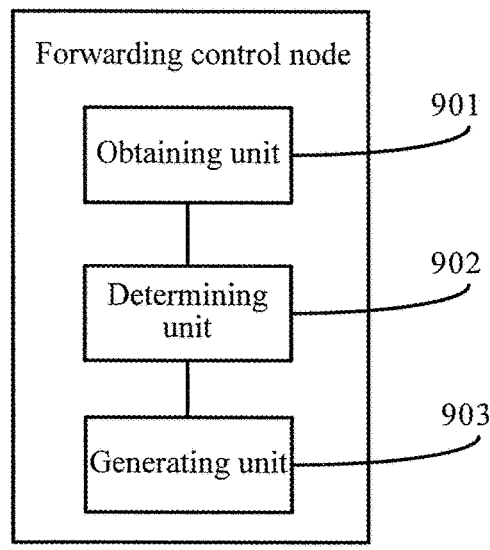
FIG. 9 is a schematic function diagram of a forwarding control node according to an embodiment of the present invention.
Figure 10:
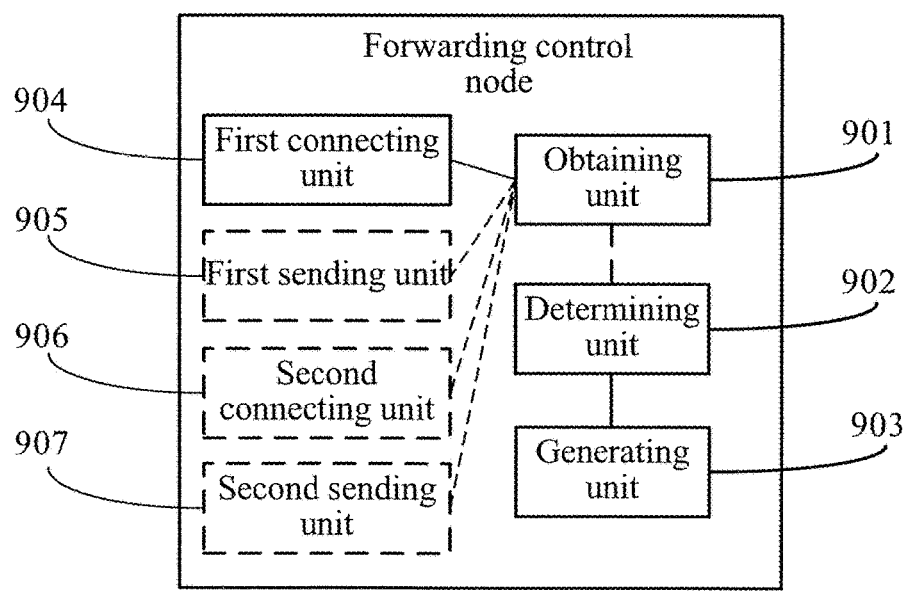
FIG. 10 is a schematic function diagram of another forwarding control node according to an embodiment of the present invention.

FIG. 9 and FIG. 10 are schematic function diagrams of a forwarding control node according to embodiments of the present invention. As shown in FIG. 9 and FIG. 10, the forwarding control node includes: an obtaining unit 901, a determining unit 902, and a generating unit 903.

The obtaining unit 901 is configured to obtain a processing rule of a service and connection information of a virtual network.

The connection information of the virtual network includes a virtual processing node, a virtual switching node, and a physical network node. The virtual processing node is configured to perform a specific type of processing on a data packet. The virtual switching node is configured to forward the data packet. The processing rule of the service is used to indicate a sequence of processing required for the data packet.

The determining unit 902 is configured to determine, according to the processing rule of the service and the connection information of the virtual network which are obtained by the obtaining unit 901, a forwarding path that a data packet of the service needs to pass through.

The forwarding path includes a virtual processing node, a virtual switching node, and a physical network node.

The generating unit 903 is configured to generate a corresponding forwarding rule for the virtual switching node according to the forwarding path determined by the determining unit 902.

The forwarding rule is used to indicate a next virtual processing node, virtual switching node, or physical network node to which the data packet needs to be forwarded.

Further, when the forwarding control node is a network control node, the forwarding control node further includes a first connecting unit 904.

The network control node is configured to manage networking of the virtual network, and the connection information of the virtual network is stored in the network control node.

The first connecting unit 904 is configured to establish a connection to a service control node.

The obtaining unit 901 is specifically configured to obtain the connection information of the virtual network locally.

The obtaining unit 901 is specifically configured to obtain the processing rule of the service from the service control node.

The service control node is configured to manage processing of the service, and the processing rule of the service is stored in the service control node.

Further, when the forwarding control node is a network control node, the forwarding control node further includes a first sending unit 905.

The network control node is configured to manage networking of the virtual network, and the connection information of the virtual network is stored in the network control node.

The first sending unit 905 is configured to send a connection establishment request message to the virtual switching node, so that the virtual switch establishes a connection to the network control node.

The connection establishment request message carries first identification information, which is used to identify that the virtual switching node forwards the processing rule of the service to the network control node after reception of the processing rule of the service sent by the service control node.

The obtaining unit 901 is specifically configured to obtain the connection information of the virtual network locally.

The obtaining unit 901 is specifically configured to obtain the processing rule of the service from the virtual switching node.

The processing rule of the service is stored in the virtual switching node.

Further, when the forwarding control node is a service control node, the forwarding control node further includes a second connecting unit 906.

The service control node is configured to manage processing of the service, and the processing rule of the service is stored in the service control node.

The second connecting unit 906 is configured to establish a connection to the network control node.

The obtaining unit 901 is specifically configured to obtain the processing rule of the service locally.

The obtaining unit 901 is specifically configured to obtain the connection information of the virtual network from the network control node.

The network control node is configured to manage networking of the virtual network, and the connection information of the virtual network is stored in the network control node.

Further, when the forwarding control node is a service control node, the forwarding control node further includes a second sending unit 907.

The service control node is configured to manage processing of the service, and the processing rule of the service is stored in the service control node.

The second sending unit 907 is configured to send a connection establishment request message to the virtual switching node, so that the virtual switch establishes a connection to the service control node.

The connection establishment request message carries first identification information, which is used to identify that the virtual switching node forwards the connection information of the virtual network to the service control node after reception of connection information of the virtual network sent by the network control node.

The obtaining unit 901 is specifically configured to obtain the processing rule of the service locally.

The obtaining unit 901 is specifically configured to obtain the connection information of the virtual network from the virtual switching node.

The connection information of the virtual network is stored in the virtual switching node.

The embodiment of the present invention provides a forwarding control node. The forwarding control node first obtains a processing rule of a service and connection information of a virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node. In this way, the forwarding control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 11:
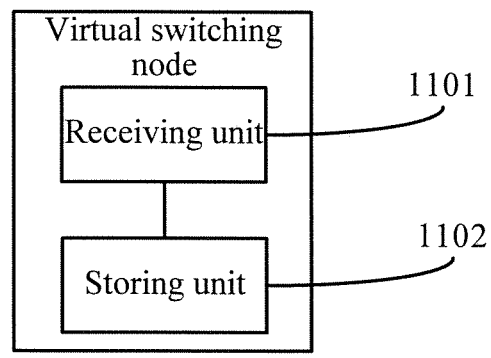
FIG. 11 is a schematic function diagram of a virtual switching node according to an embodiment of the present invention.
Figure 12:
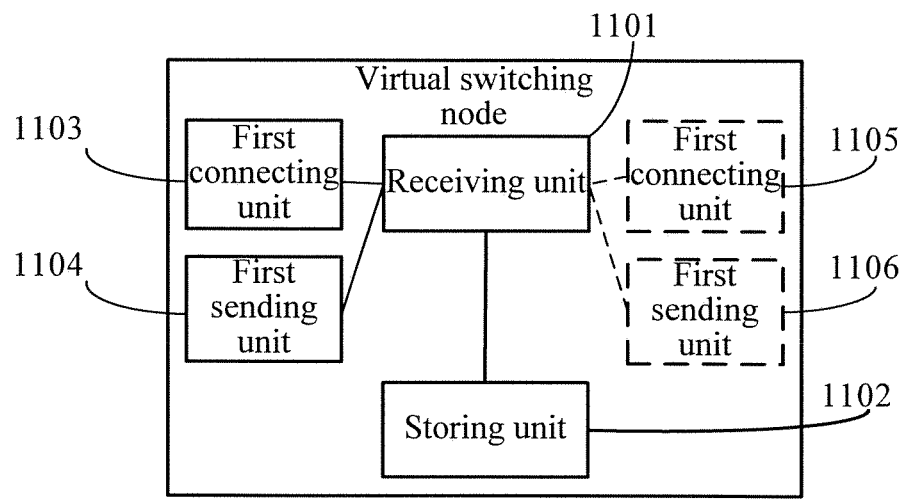
FIG. 12 is a schematic function diagram of another virtual switching node according to an embodiment of the present invention.

FIG. 11 and FIG. 12 are schematic function diagrams of a virtual switching node according to embodiments of the present invention. As shown in FIG. 11 and FIG. 12, the virtual switching node includes a receiving unit 1101 and a storing unit 1102.

The receiving unit 1101 is configured to receive a forwarding rule sent by a forwarding control node.

The forwarding rule is used to indicate a next virtual processing node, virtual switching node, or physical network node to which a data packet needs to be forwarded.

The storing unit 1102 is configured to store the forwarding rule.

Further, when the forwarding control node is a network control node, the virtual switching node further includes a first connecting unit 1103 and a first sending unit 1104.

The network control node is configured to manage networking of the virtual network, and connection information of the virtual network is stored in the network control node.

The receiving unit 1101 is further configured to receive a connection establishment request message sent by the network control node.

The connection establishment request message carries first identification information.

The first connecting unit 1103 is configured to establish a connection to the network control node.

The first connecting unit 1103 is further configured to establish a connection to a service control node.

The receiving unit 1101 is further configured to receive a processing rule of a service sent by the service control node.

The first sending unit 1104 is configured to send, according to the first identification information, the processing rule of the service received by the receiving unit to the network control node.

Further, when the forwarding control node is a service control node, the virtual switching node further includes a second connecting unit 1105 and a second sending unit 1106.

The service control node is configured to manage processing of the service, and the processing rule of the service is stored in the service control node.

The receiving unit 1101 is further configured to receive a connection establishment request message sent by the service control node.

The connection establishment request message carries first identification information.

The second connecting unit 1105 is configured to establish a connection to the service control node.

The second connecting unit 1105 is further configured to establish a connection to a network control node.

The receiving unit 1101 is further configured to receive the connection information of the virtual network sent by the network control node.

The second sending unit 1106 is configured to send, according to the first identification information, the connection information of the virtual network received by the receiving unit to the service control node.

The embodiment of the present invention provides a virtual switching node. The virtual switching node receives a forwarding rule sent by a forwarding control node, and stores the forwarding rule. In this way, after the forwarding control node generates a forwarding rule combining a processing rule of a service and connection information of a virtual network, the forwarding control node can send the forwarding rule to a virtual switching node, so that the virtual switching node stores the forwarding rule. Therefore, during packet forwarding, the forwarding rule combining the processing rule of the service and the connection information of the virtual network can be searched out, and further, network connectivity can be ensured during service processing, thereby improving user experience.

Figure 13:
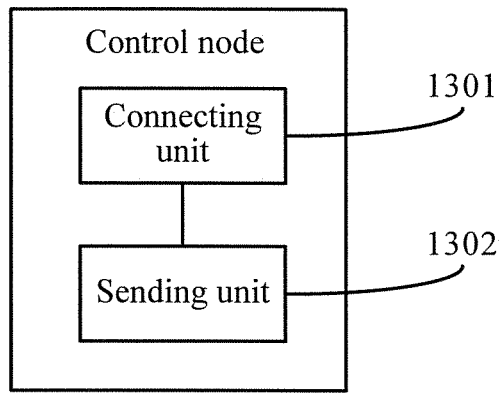
FIG. 13 is a schematic function diagram of a control node according to an embodiment of the present invention.

FIG. 13 is a schematic function diagram of a control node according to an embodiment of the present invention. As shown in FIG. 13, the control node includes a connecting unit 1301 and a sending unit 1302.

The connecting unit 1301 is configured to establish a connection to a forwarding control node or a virtual switching node.

The sending unit 1302 is configured to send first information to the forwarding control node or the virtual switching node.

Further, when the forwarding control node is a network control node, the first control node is a service control node, and the first information is a processing rule of a service.

The network control node is configured to manage networking of a virtual network, and connection information of the virtual network is stored in the network control node. The service control node is configured to manage processing of the service, and the processing rule of the service is stored in the service control node.

Further, when the forwarding control node is a service control node, the first control node is a network control node, and the first information is the connection information of the virtual network.

The service control node is configured to manage processing of the service, and the processing rule of the service is stored in the service control node. The network control node is configured to manage networking of the virtual network, and the connection information of the virtual network is stored in the network control node.

The embodiment of the present invention provides a control node. The control node establishes a connection to a forwarding control node or a virtual switching node, and then directly sends first information to the forwarding control node, or sends first information to the virtual switching node which then forwards the first information to the forwarding control node, so that the forwarding control node generates a forwarding rule. Therefore, during packet forwarding, the forwarding rule combining a processing rule of a service and connection information of a virtual network can be searched out, and further, network connectivity can be ensured during service processing, thereby improving user experience.

Figure 14:
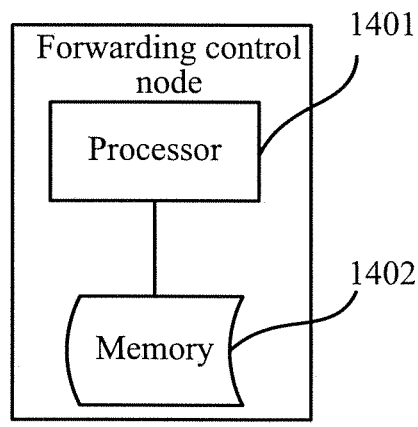
FIG. 14 is a schematic structural diagram of a forwarding control node according to an embodiment of the present invention.

FIG. 14 is a schematic structural diagram of a forwarding control node according to an embodiment of the present invention. As shown in FIG. 14, the forwarding control node includes a processor 1401 and a memory 1402.

The processor 1401 is configured to obtain a processing rule of a service and connection information of a virtual network.

The connection information of the virtual network includes a virtual processing node, a virtual switching node, and a physical network node. The virtual processing node is configured to perform a specific type of processing on a data packet. The virtual switching node is configured to forward the data packet. The processing rule of the service is used to indicate a sequence of processing required for the data packet.

The processor 1401 is further configured to determine, according to the processing rule of the service and the connection information of the virtual network, a forwarding path that a data packet of the service needs to pass through.

The forwarding path includes a virtual processing node, a virtual switching node, and a physical network node.

The processor 1401 is further configured to generate a corresponding forwarding rule for the virtual switching node according to the forwarding path.

The forwarding rule is used to indicate a next virtual processing node, virtual switching node, or physical network node to which the data packet needs to be forwarded.

Further, when the forwarding control node is a network control node, the processor 1401 is further configured to establish a connection to a service control node.

The network control node is configured to manage networking of the virtual network, and the connection information of the virtual network is stored in the network control node.

The processor 1401 is specifically configured to obtain the connection information of the virtual network from the memory.

The processor 1401 is specifically configured to obtain the processing rule of the service from the service control node.

The service control node is configured to manage processing of the service, and the processing rule of the service is stored in the service control node.

Further, when the forwarding control node is a network control node, the processor 1401 is further configured to send a connection establishment request message to the virtual switching node, so that the virtual switching node establishes a connection to a network control node.

The network control node is configured to manage networking of the virtual network, and the connection information of the virtual network is stored in the network control node. The connection establishment request message carries first identification information, which is used to identify that the virtual switching node forwards the processing rule of the service to the network control node after reception of the processing rule of the service sent by the service control node.

The processor 1401 is specifically configured to obtain the connection information of the virtual network from the memory.

The processor 1401 is specifically configured to obtain the processing rule of the service from the virtual switching node.

The processing rule of the service is stored in the virtual switching node.

Further, when the forwarding control node is a service control node, the processor 1401 is further configured to establish a connection to a network control node.

The service control node is configured to manage processing of the service, and the processing rule of the service is stored in the service control node.

The processor 1401 is specifically configured to obtain the processing rule of the service from the memory.

The processor 1401 is specifically configured to obtain the connection information of the virtual network from the network control node.

The network control node is configured to manage networking of the virtual network, and the connection information of the virtual network is stored in the network control node.

Further, when the forwarding control node is a service control node, the processor is further configured to send a connection establishment request message to the virtual switching node, so that the virtual switching node establishes a connection to the service control node.

The service control node is configured to manage processing of the service, and the processing rule of the service is stored in the service control node. The connection establishment request message carries first identification information, which is used to identify that the virtual switching node forwards the connection information of the virtual network to the service control node after reception of connection information of the virtual network sent by the network control node.

The processor 1401 is specifically configured to obtain the processing rule of the service from the memory.

The processor 1401 is specifically configured to obtain the connection information of the virtual network from the virtual switching node.

The connection information of the virtual network is stored in the virtual switching node.

The embodiment of the present invention provides a forwarding control node. The forwarding control node first obtains a processing rule of a service and connection information of a virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node. In this way, the forwarding control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

Figure 15:
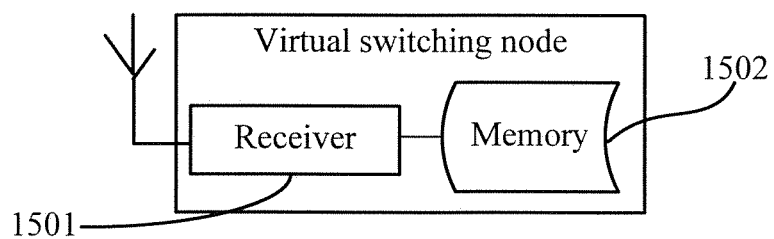
FIG. 15 is a schematic structural diagram of a virtual switching node according to an embodiment of the present invention.
Figure 16:
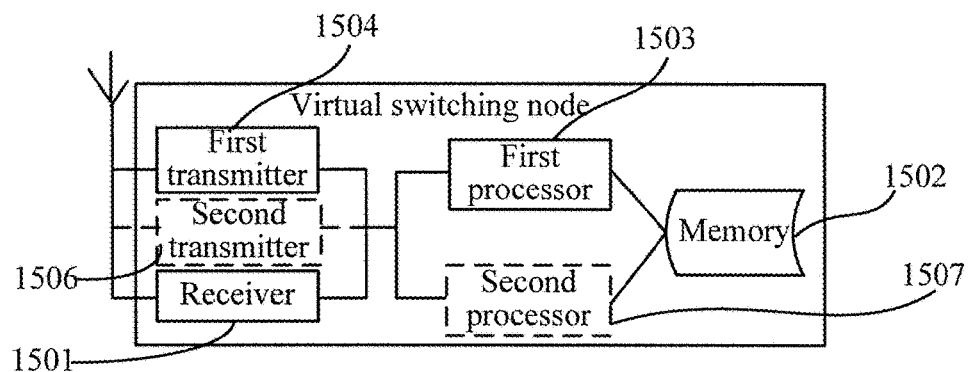
FIG. 16 is a schematic structural diagram of another virtual switching node according to an embodiment of the present invention.

FIG. 15 and FIG. 16 are schematic structural diagrams of a virtual switching node according to embodiments of the present invention. As shown in FIG. 15 and FIG. 16, the virtual switching node includes a receiver 1501 and a memory 1502.

The receiver 1501 is configured to receive a forwarding rule sent by a forwarding control node.

The forwarding rule is used to indicate a next virtual processing node, virtual switching node, or physical network node to which a data packet needs to be forwarded.

The memory 1502 is configured to store the forwarding rule.

Further, when the forwarding control node is a network control node, the virtual switching node further includes a first processor 1503 and a first transmitter 1504.

The network control node is configured to manage networking of a virtual network, and connection information of the virtual network is stored in the network control node.

The receiver 1501 is further configured to receive a connection establishment request message sent by the network control node.

The connection establishment request message carries first identification information.

The first processor 1503 is configured to establish a connection to the network control node.

The first processor 1503 is further configured to establish a connection to a service control node.

The receiver 1501 is further configured to receive a processing rule of a service sent by the service control node.

The first transmitter 1504 is configured to send, according to the first identification information, the processing rule of the service received by the receiver 1501 to the network control node.

Further, when the forwarding control node is a service control node, the virtual switching node further includes a second processor 1505 and a second transmitter 1506.

The service control node is configured to manage processing of the service, and the processing rule of the service is stored in the service control node.

The receiver 1501 is further configured to receive a connection establishment request message sent by the service control node.

The connection establishment request message carries first identification information.

The second processor 1505 is configured to establish a connection to the service control node.

The second processor 1505 is further configured to establish a connection to a network control node.

The receiver 1501 is further configured to receive the connection information of the virtual network sent by the network control node.

The second transmitter 1506 is configured to send, according to the first identification information, the connection information of the virtual network received by the receiver to the service control node.

The embodiment of the present invention provides a virtual switching node. The virtual switching node receives a forwarding rule sent by a forwarding control node, and stores the forwarding rule. In this way, after the forwarding control node generates a forwarding rule combining a processing rule of a service and connection information of a virtual network, the forwarding control node can send the forwarding rule to a virtual switching node, so that the virtual switching node stores the forwarding rule. Therefore, during packet forwarding, the forwarding rule combining the processing rule of the service and the connection information of the virtual network can be searched out, and further, network connectivity can be ensured during service processing, thereby improving user experience.

Figure 17:
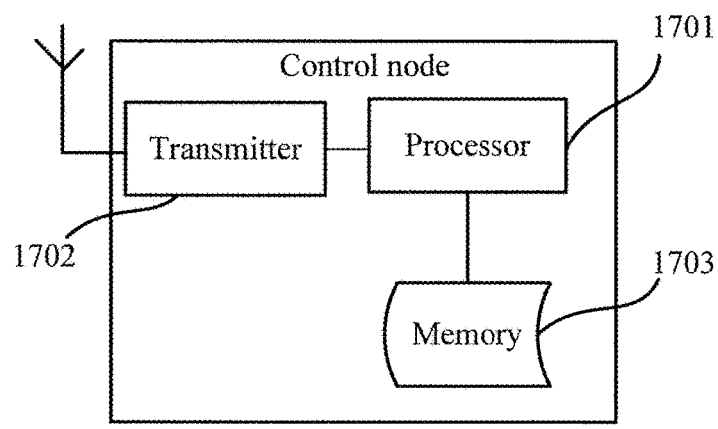
FIG. 17 is a schematic structural diagram of a control node according to an embodiment of the present invention.

FIG. 17 is a schematic structural diagram of a control node according to an embodiment of the present invention. As shown in FIG. 17, the control node includes: a processor 1701, a transmitter 1702, and a memory 1703.

The processor 1701 is configured to establish a connection to a forwarding control node or a virtual switching node.

The transmitter 1702 is configured to send first information to the forwarding control node or the virtual switching node.

Further, when the forwarding control node is a network control node, the first control node is a service control node, and the first information is a processing rule of a service.

The network control node is configured to manage networking of a virtual network, and connection information of the virtual network is stored in the network control node.

The service control node is configured to manage processing of the service, and the processing rule of the service is stored in the service control node.

Further, when the forwarding control node is a service control node, the first control node is a network control node, and the first information is the connection information of the virtual network.

The service control node is configured to manage processing of the service, and the processing rule of the service is stored in the service control node. The network control node is configured to manage networking of the virtual network, and the connection information of the virtual network is stored in the network control node.

The embodiment of the present invention provides a control node. The control node establishes a connection to a forwarding control node or a virtual switching node, and then directly sends first information to the forwarding control node, or sends first information to the virtual switching node which then forwards the first information to the forwarding control node, so that the forwarding control node generates a forwarding rule. Therefore, during packet forwarding, the forwarding rule combining a processing rule of a service and connection information of a virtual network can be searched out, and further, network connectivity can be ensured during service processing, thereby improving user experience.

Figure 18:
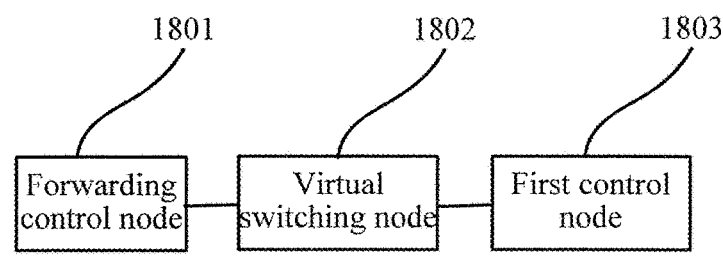
FIG. 18 is a schematic structural diagram of a system for controlling forwarding of service data in a virtual network according to an embodiment of the present invention.

FIG. 18 is a schematic structural diagram of a system for controlling forwarding of service data in a virtual network according to an embodiment of the present invention. As shown in FIG. 18, the system includes a forwarding control node 1801, a virtual switching node 1802, and a first control node 1803.

The forwarding control node 1801 is the forwarding control node provided by the foregoing embodiment, the virtual switching node 1802 is the virtual switching node provided by the foregoing embodiment, and the first control node 1803 is the control node provided by the foregoing embodiment.

The embodiment of the present invention provides a system for controlling forwarding of service data in a virtual network. A forwarding control node first obtains a processing rule of a service and connection information of a virtual network; determines, according to the processing rule of the service and the connection information of the virtual network, a forwarding path that a data packet of the service needs to pass through; generates a corresponding forwarding rule for a virtual switching node; and finally, sends the forwarding rule to the virtual switching node. In this way, the forwarding control node can generate a forwarding rule combining the processing rule of the service and the connection information of the virtual network, and send the forwarding rule to the virtual switching node. Therefore, during packet forwarding, the forwarding rule combining the processing rule of the service and the connection information of the virtual network can be searched out, and further, network connectivity can be ensured during service processing, thereby improving user experience.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented by hardware in addition to a software functional unit, or by hardware only.

The integrated unit implemented in the form of software functional unit may be stored in a computer readable storage medium. The software functional unit is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for controlling forwarding of service data in a virtual network, the method comprising:
   obtaining, by a forwarding control node, a processing rule of a service and connection information of the virtual network, wherein the forwarding control node comprises a network control node configured to manage networking of the virtual network, and the connection information of the virtual network is stored in the network control node, comprising:
      establishing, by the network control node, a connection to a service control node;
      obtaining, by the network control node, the connection information of the virtual network locally, and
      obtaining, by the network control node, the processing rule of the service from the service control node, wherein the service control node is configured to manage processing of the service, and the processing rule of the service is stored in the service control node;
   determining, by the forwarding control node according to the processing rule of the service and the connection information of the virtual network, a forwarding path that a data packet of the service needs to pass through, wherein the forwarding path comprises a virtual processing node, a virtual switching node, and a physical network node;
   generating, by the forwarding control node, a corresponding forwarding rule for the virtual switching node according to the forwarding path; and
   sending, by the forwarding control node, the forwarding rule to the virtual switching node, wherein:
      the connection information of the virtual network comprises information about the virtual processing node, the virtual switching node, and the physical network node,
      the virtual processing node is configured to perform a specific type of processing on the data packet,
      the virtual switching node is configured to forward the data packet,
      the processing rule of the service indicates a sequence of processing required for the data packet, and
      the forwarding rule indicates a next virtual processing node, a next virtual switching node, or a next physical network node to which the data packet needs to be forwarded.

2. A forwarding control node, comprising:
   a non-transitory memory storage comprising instructions; and
   one or more processors in communication with the memory, wherein the one or more processors execute the instructions to:
      obtain a processing rule of a service and connection infatuation of a virtual network,
      determine, according to the obtained processing rule of the service and the connection information of the virtual network, a forwarding path that a data packet of the service needs to pass through, wherein the forwarding path comprises a virtual processing node, a virtual switching node, and a physical network node, and
      generate a corresponding forwarding rule for the virtual switching node according to the determined forwarding path, wherein:
         the connection information of the virtual network comprises information about the virtual processing node, the virtual switching node, and the physical network node;
         the virtual processing node is configured to perform a specific type of processing on the data packet;
         the virtual switching node is configured to forward the data packet;
         the processing rule of the service indicates a sequence of processing required for the data packet; and
         the forwarding rule indicates a next virtual processing node, a next virtual switching node, or a next physical network node to which the data packet needs to be forwarded; wherein:
   the forwarding control node is a network control node configured to manage networking of the virtual network, and the connection information of the virtual network is stored in the network control node; and
   the one or more processors execute the instructions to:
      establish a connection to a service control node,
      obtain the connection information of the virtual network locally, and
      obtain the processing rule of the service from the service control node, wherein the service control node is configured to manage processing of the service, and the processing rule of the service is stored in the service control node.

3. A virtual switching node, comprising:

a non-transitory memory storage comprising instructions; and one or more processors in communication with the memory, wherein the one or more processors execute the instructions to:
- receive a forwarding rule sent by a forwarding control node for indicating a next virtual processing node, a next virtual switching node, or a next physical network node to which a data packet needs to be forwarded, and
- store the forwarding rule; wherein:

the forwarding control node is a network control node configured to manage networking of a virtual network, and connection information of the virtual network is stored in the network control node; and the one or more processors execute the instructions to:
- receive a connection establishment request message sent by the network control node, wherein the connection establishment request message carries first identification information,
- establish a connection to the network control node
- establish a connection to a service control node,
- receive a processing rule of a service sent by the service control node, and
- send, according to the first identification information, the processing rule of the service received by the receiving unit to the network control node.

* * * * *